(12) United States Patent
Kosugi et al.

(10) Patent No.: US 7,174,984 B2
(45) Date of Patent: Feb. 13, 2007

(54) MOTORCYCLE

(75) Inventors: Makoto Kosugi, Shizuoka (JP); Toru Zenno, Shizuoka (JP); Masaichi Yamada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 198 days.

(21) Appl. No.: 10/511,887

(22) PCT Filed: Apr. 25, 2003

(86) PCT No.: PCT/JP03/05365

§ 371 (c)(1),
(2), (4) Date: Oct. 19, 2004

(87) PCT Pub. No.: WO03/091059

PCT Pub. Date: Nov. 6, 2003

(65) Prior Publication Data
US 2005/0217915 A1    Oct. 6, 2005

(30) Foreign Application Priority Data
Apr. 26, 2002 (JP) .............................. 2002-127107

(51) Int. Cl.
*B62K 11/00* (2006.01)
*B62M 7/00* (2006.01)

(52) U.S. Cl. .............. 180/219; 180/230; 180/291
(58) Field of Classification Search .......... 180/219, 180/230; 280/291
See application file for complete search history.

(56) References Cited
U.S. PATENT DOCUMENTS 4,388,979 A * 6/1983 Fritzenwenger ............. 180/226
5,299,652 A * 4/1994 Bevins ..................... 180/219
6,073,719 A   6/2000 Ohmika et al.
6,131,682 A * 10/2000 Walker ..................... 180/219
6,257,081 B1 * 7/2001 Gagnon et al. ............... 74/335
6,276,481 B1 * 8/2001 Matsuto et al. ............. 180/220
6,357,545 B1   3/2002 Hori et al.
6,405,821 B2 * 6/2002 Tsutsumikoshi ............ 180/226
6,524,224 B2 * 2/2003 Gagnon et al. ............. 477/175
6,705,446 B2 * 3/2004 Drussel et al. .............. 192/83

(Continued)

FOREIGN PATENT DOCUMENTS

JP          163905/1984         5/1986

(Continued)

*Primary Examiner*—Lesley D. Morris
*Assistant Examiner*—Marc A. Scharich
(74) *Attorney, Agent, or Firm*—Hogan & Hartson LLP

(57) ABSTRACT

The invention prevents a decrease in a bank angle while cornering and reduces damage incurred to an AMT mechanism when tumbling over. A motorcycle 1 includes a cylinder block 47 of an engine, a crankcase 49 located below this cylinder block 47, a transmission 55 located behind this crankcase 49 and provided with a multistage shifting mechanism having multistage change gears, a clutch for connecting/disconnecting transmission of rotation when shifting the change gears of this transmission 55, and an AMT mechanism 63 for automatically actuating this clutch and shifting the change gears of the transmission 55. Since this AMT mechanism 63 is located behind the cylinder block 47 and above the transmission 55, a decrease in the bank angle is prevented while cornering, and fatal damage to the AMT mechanism 63 can be reduced when the motorcycle 1 tumbles over.

7 Claims, 5 Drawing Sheets

U.S. PATENT DOCUMENTS

| | | | |
|---|---|---|---|
| 6,910,563 B2 * | 6/2005 | Maimone | 192/83 |
| 2002/0023795 A1 | 2/2002 | Nagai | |

FOREIGN PATENT DOCUMENTS

| | | |
|---|---|---|
| JP | 11-059551 | 3/1999 |
| JP | 2001-124203 | 5/2001 |
| JP | 2002-067741 | 3/2002 |

* cited by examiner

MOTORCYCLE

TECHNICAL FIELD

The present invention relates to a motorcycle with improvement in placement of an automatic transmission control device.

BACKGROUND ART

In a conventional motorcycle, rotation of a crank shaft inside a crankcase cover of an engine is changed by a transmission. In this transmission, a multistage shifting mechanism including a main shaft of a gearbox, a drive shaft, and multistage change gears is housed therein, and a clutch for connecting/disconnecting transmission of rotation when shifting the change gears is provided. Moreover, an automatic transmission control device for automatically actuating the clutch and shifting the change gears of the transmission, in other words, an AMT (automated transmission) mechanism is provided.

This AMT mechanism includes a clutch actuator for actuating the clutch, a shift actuator for shifting the change gears of the transmission, and other components necessary for the AMT. The AMT mechanism is either semi-automatic or full-automatic. This AMT mechanism is provided beside and below the crankcase cover in a car width direction.

Incidentally, in the conventional motorcycle, the AMT mechanism is provided beside and below the crankcase cover in the car width direction, thus there have been problems that the AMT mechanism hits the ground in the first place and suffers damage when banking the motorcycle while cornering, and that a bank angle of the motorcycle is limited while cornering because of the AMT mechanism hitting the ground.

Moreover, there has been a problem that the AMT mechanism is susceptible to damage when the motorcycle tumbles over, and it is highly likely that shift change becomes impossible.

DISCLOSURE OF THE INVENTION

The present invention has been accomplished to solve the foregoing problems, and an object thereof is to provide a motorcycle which is capable of preventing a decrease in the bank angle while cornering, and of reducing damage incurred to the AMT mechanism when tumbling over.

A motorcycle according to a first aspect of the present invention for attaining the object is a motorcycle including a cylinder block of an engine, a crankcase located below this cylinder block, a transmission located behind this crankcase and provided with a multistage shifting mechanism having multistage change gears, a clutch for connecting/disconnecting transmission of rotation when shifting the change gears of this transmission, and an automatic transmission control device for automatically actuating this clutch and shifting the change gears of the transmission, which is characterized in that the automatic transmission control device is located behind the cylinder block and above the transmission.

According to the motorcycle of this first aspect, since the automatic transmission control device is located behind the cylinder block and above the transmission, a decrease in a bank angle is prevented when the motorcycle performs cornering. Moreover, fatal damage to the AMT mechanism is reduced when the motorcycle tumbles over.

A motorcycle according to a second aspect of the present invention for attaining the object is a motorcycle including a cylinder block of an engine, a crankcase located below this cylinder block, a transmission located behind this crankcase and provided with a multistage shifting mechanism having multistage change gears, a clutch for connecting/disconnecting transmission of rotation when shifting the change gears of this transmission, and an automatic transmission control device for automatically actuating this clutch and shifting the change gears of the transmission, which is characterized in that the automatic transmission control device is located in a space between two left and right straight lines respectively connecting a tread surface of a tire of the motorcycle and tips of left and right steps in a car width direction for allowing a driver to step on.

Therefore, as similar to an operation of the motorcycle according to the first aspect of the present invention, the decrease in the bank angle is prevented when the motorcycle performs cornering. Moreover, the damage to the AMT mechanism can be reduced when the motorcycle tumbles over.

BEST MODES FOR CARRYING OUT THE INVENTION

In the following, description will be made on a motorcycle according to embodiments of the present invention with reference to the drawings.

It is to be noted that up and down, left and right, and front and back in this embodiment mean left and right, front and back, and up and down in a state where a driver is seated on a seat of a motorcycle according to the embodiments so as to face handle thereof.

Figure 1:
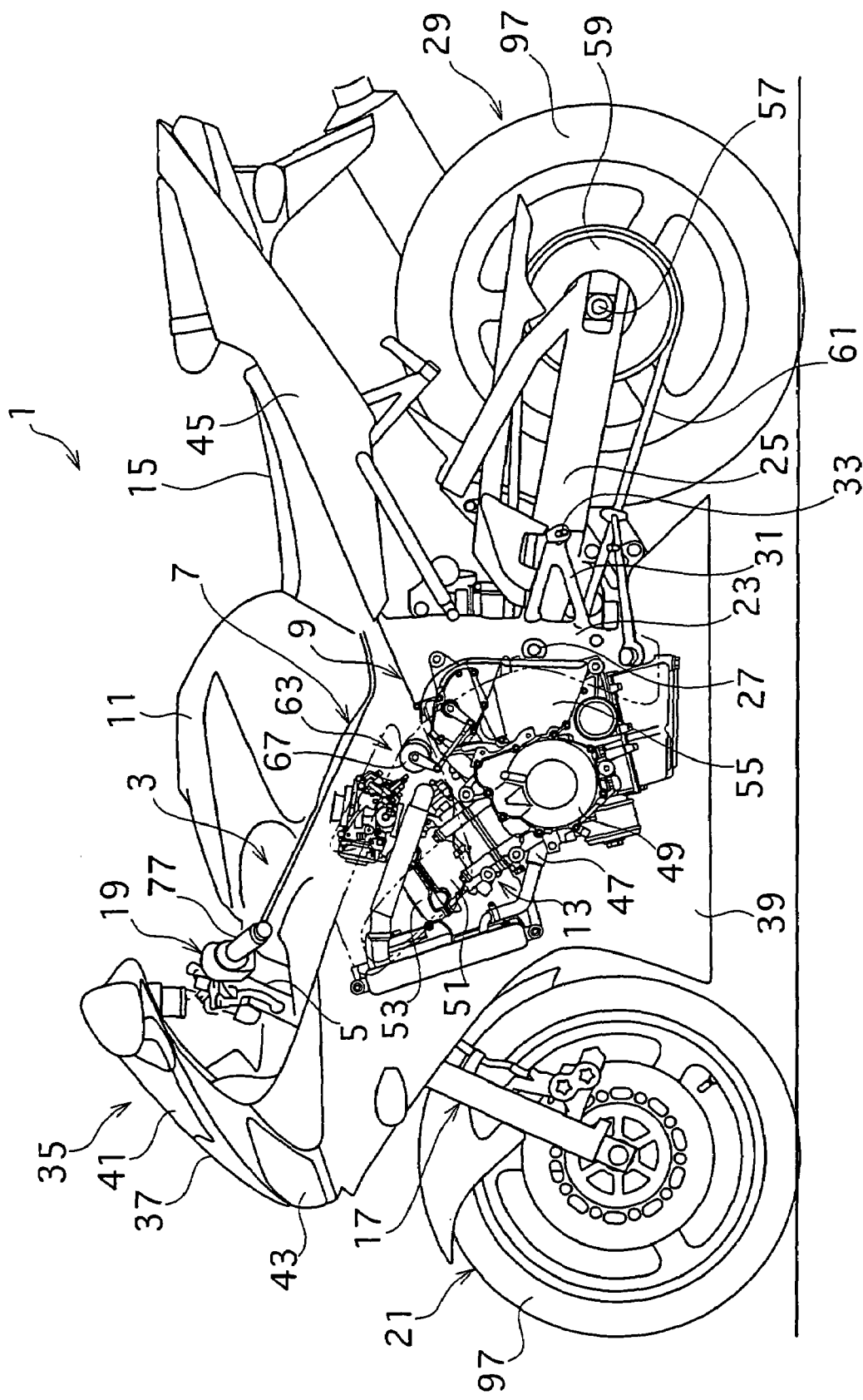
FIG. 1 is a left side view of a motorcycle according to an embodiment of the present invention.

Referring to FIG. 1, a motorcycle 1 according to this embodiment has a structure in which a car body frame 3 is connected to a head pipe 5 and a rear frame 9 extending obliquely backward is connected to rear ends of a left and right pair of tank rails 7. A fuel tank 11 is provided above the tank rails 7, and an engine unit 13 is provided therebelow. A main seat 15 is provided in front of the rear frame 9.

Meanwhile, a front fork 17 is pivotally supported by the head pipe 5, steering handle 19 are provided on an upper end of the front fork 17, and a front wheel 21 is provided on a lower end thereof. Moreover, a rear arm 25 is pivotally supported as vertically swingable by a rear arm bracket 23 below the rear ends of the tank rails 7 through a pivot shaft 27, and a rear wheel 29 is provided at a rear end of the rear arm 25. Moreover, the rear arm bracket 23 is provided with a step bracket 31 so as to protrude backward, and steps 33 for placing feet of a driver are provided on the step bracket 31 outward in the car width direction.

Meanwhile, a cowling 35 is provided on the car body frame 3. This cowling 35 includes an upper cowling 37 for covering a front part of the steering handle 19, and a lower cowling 39 for covering a front part and left and right sides of the tank rails 7 as well as left and right lower parts of the engine unit 13. Here, the upper cowling 37 is supported by the car body frame 3 through an unillustrated stay and adopts a structure by which a front face of a front part of the car body and both side faces in the left-and-right direction are formed, and a screen 41 made of a transparent material, a head lamp 43, and the like are fitted to an upper part of a front side of the car body.

Moreover, the rear frame 9 is provided with side covers 45 for covering left and right sides of the main seat 15 and an upper part of the rear wheel 29.

In this embodiment, the engine unit 13 is of water-cooled, four-cycle, parallel four-cylinder type, in which a cylinder axis of a cylinder block 47 is slightly inclined to the front part of the car body, and a crankcase 49 located below the cylinder block 47 for housing a crank shaft is hung across and supported by the car body frame 3 toward the car width direction. Here, a cylinder head 51 and a head cover 53 are stacked and joined together on an upper face of the cylinder block 47.

Meanwhile, a gearbox case 55 (a transmission) for housing a multistage shifting mechanism which includes a main shaft of a gearbox provided parallel to the crank shaft, a drive shaft, and multistage change gears, is integrally formed at a rear part of the cylinder block 47. This transmission 55 is provided with a clutch for connecting/disconnecting transmission of rotation when shifting the change gears. The crankcase 49 is joined to lower surfaces of the cylinder block 47 and the transmission 55.

Moreover, a driven sprocket 59 is provided to a spindle 57 which rotatably supports the rear wheel 29 at the rear end of the rear arm 25. A chain 61 is wound around this driven sprocket 59 and an unillustrated driving sprocket which is fixed to the drive shaft of the engine unit 13. In this way, power of the engine is transmitted to the rear wheel 29 through the chain 61.

A hydraulic automatic transmission control device 63 (hereinafter referred to as an "AMT mechanism") in the motorcycle 1 will be described.

The AMT (automated transmission) mechanism 63 is configured to actuate the clutch and shift the change gears of the transmission 55 automatically, and includes a clutch actuator 65 (see FIG. 3) for actuating the clutch, a shift actuator 67 for shifting the change gears of the transmission 55, and other components necessary for the AMT. Here, this AMT mechanism 63 is either semi-automatic or full-automatic.

Figure 2:
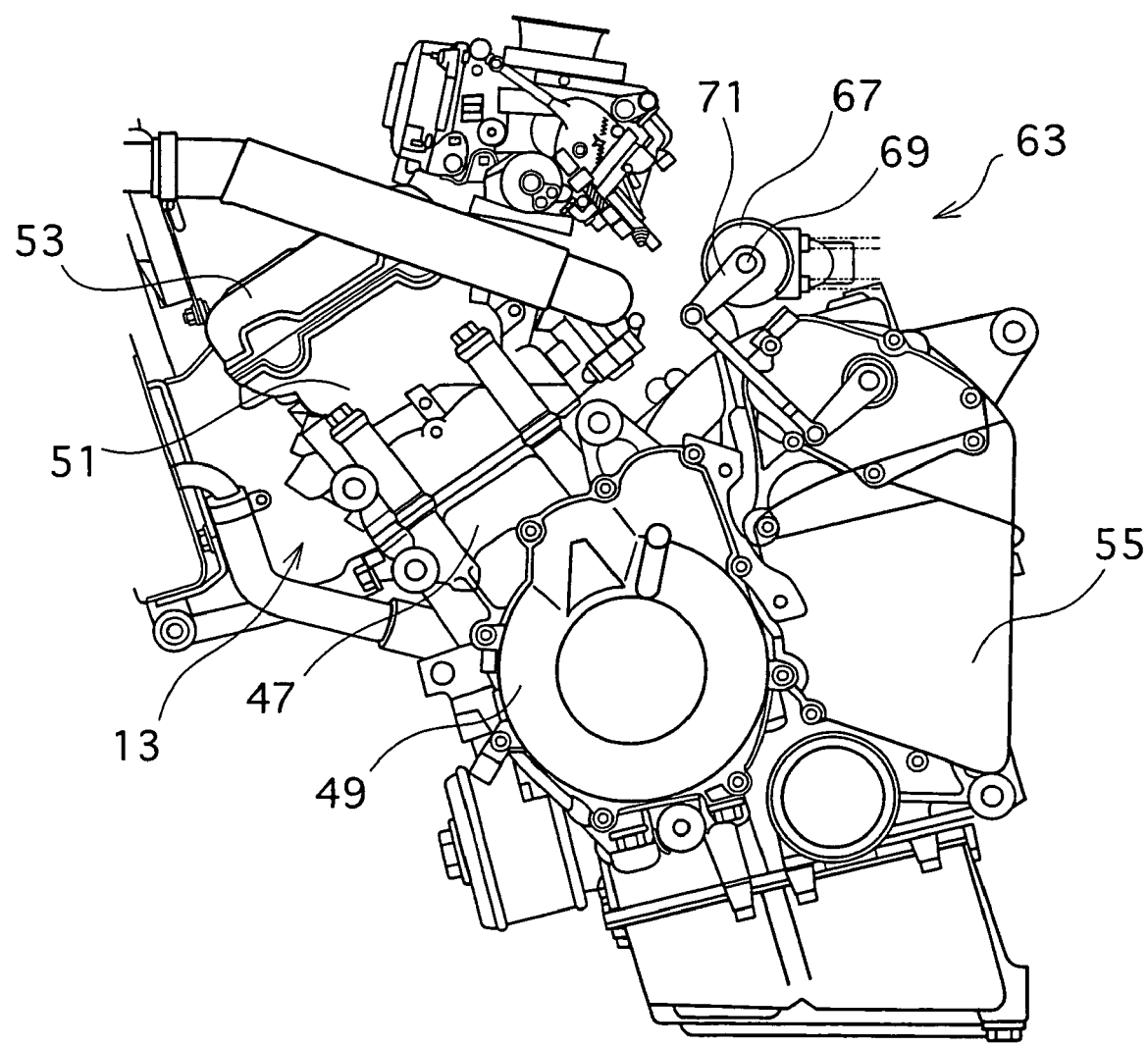
FIG. 2 is an enlarged left side view of an engine unit of FIG. 1.
Figure 3:
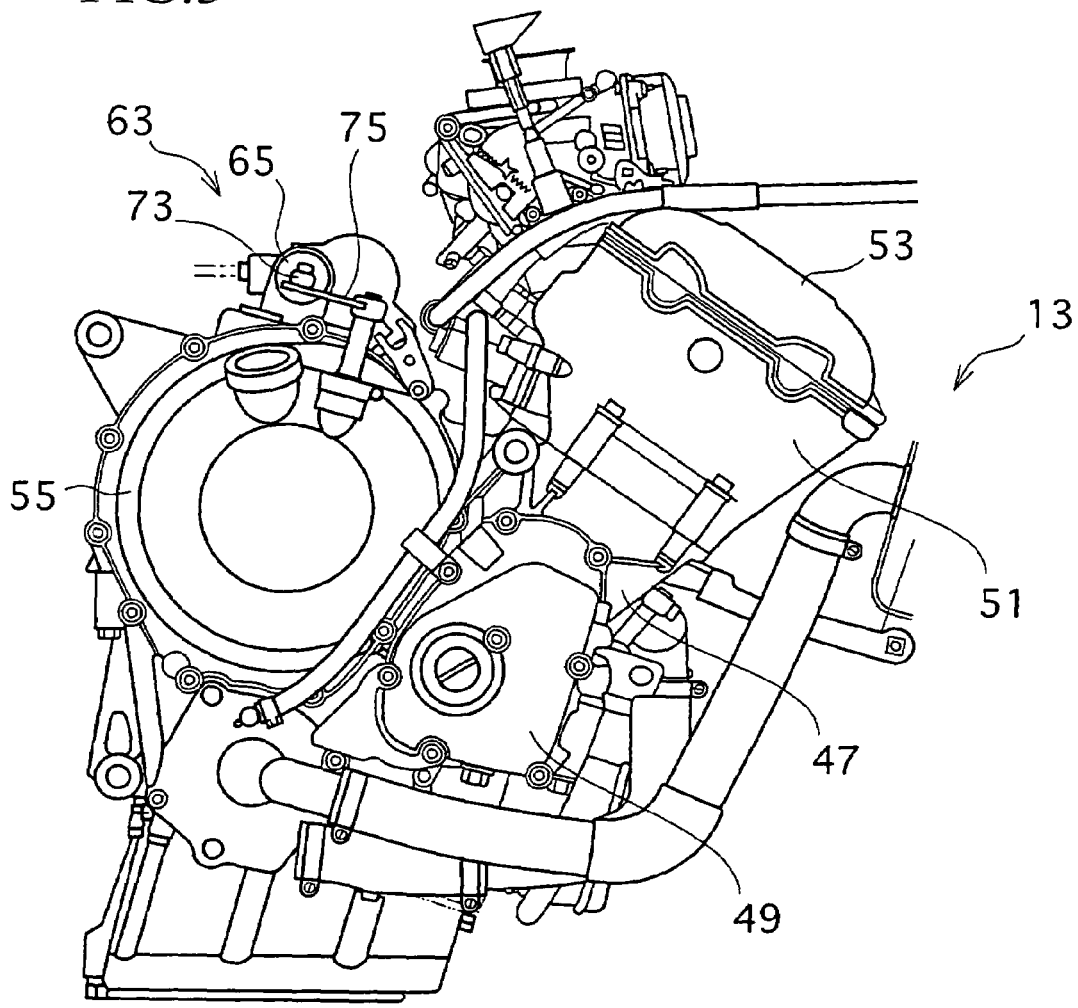
FIG. 3 is an enlarged right side view of the engine unit of the motorcycle of FIG. 1.
Figure 4:
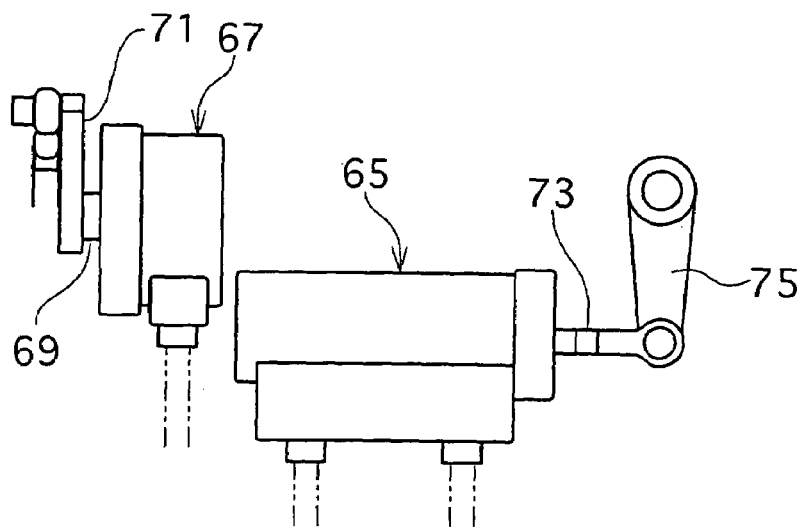
FIG. 4 is a rear view of a shift actuator and a clutch actuator viewed when the motorcycle of FIG. 1 is oriented to a traveling direction.

Referring to FIG. 2 to FIG. 4, the AMT mechanism 63 is located behind the cylinder block 47 and above the transmission 55.

For example, the shift actuator 67 is located on the left side in a traveling direction of the motorcycle 1 and above the transmission 55, and is configured to actuate the multistage shifting mechanism inside the transmission 55 by use of a link mechanism composed of a rod 69 and a lever 71 as shown in FIG. 2 and FIG. 4. Meanwhile, the clutch actuator 65 is located on the right side in the traveling direction of the motorcycle 1 and above the transmission 55, and is configured to shift the clutch inside the transmission 55 by use of a link mechanism composed of a rod 73 and a lever 75 as shown in FIG. 3 and FIG. 4.

Here, a system of the AMT mechanism 63 will be described in detail.

Figure 6:
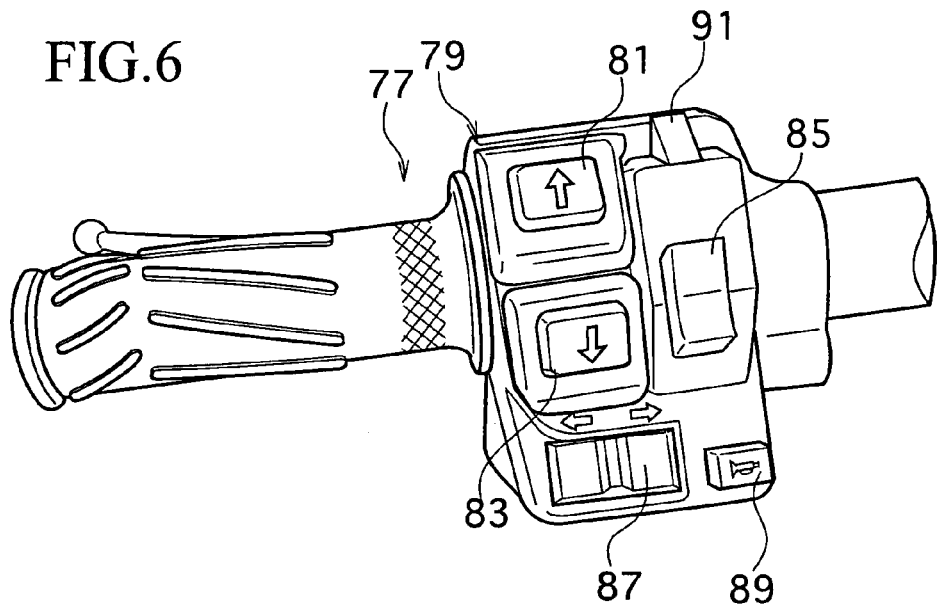
FIG. 6 is a schematic drawing of switches on a clip side of a left handle.

Referring to FIG. 6, a shift switch 79 is provided on a grip side of a left handle 77, for example. This shift switch 79 includes an up switch 81 and a down switch 83, for example, and is configured to change a shift position of the change gears from a neutral position to a first gear and the fastest sixth gear, for example, in an increasing or decreasing direction by manual operation of a driver. Moreover, the grip side of the left handle 77 is also provided with an AMT switch 85, a turn signal 87, a horn 89, and a light switch 91. Note that the AMT switch 85 is configured to switch a gear shift operation to be operated either in a semi-automatic mode or in a full-automatic mode.

Figure 7:
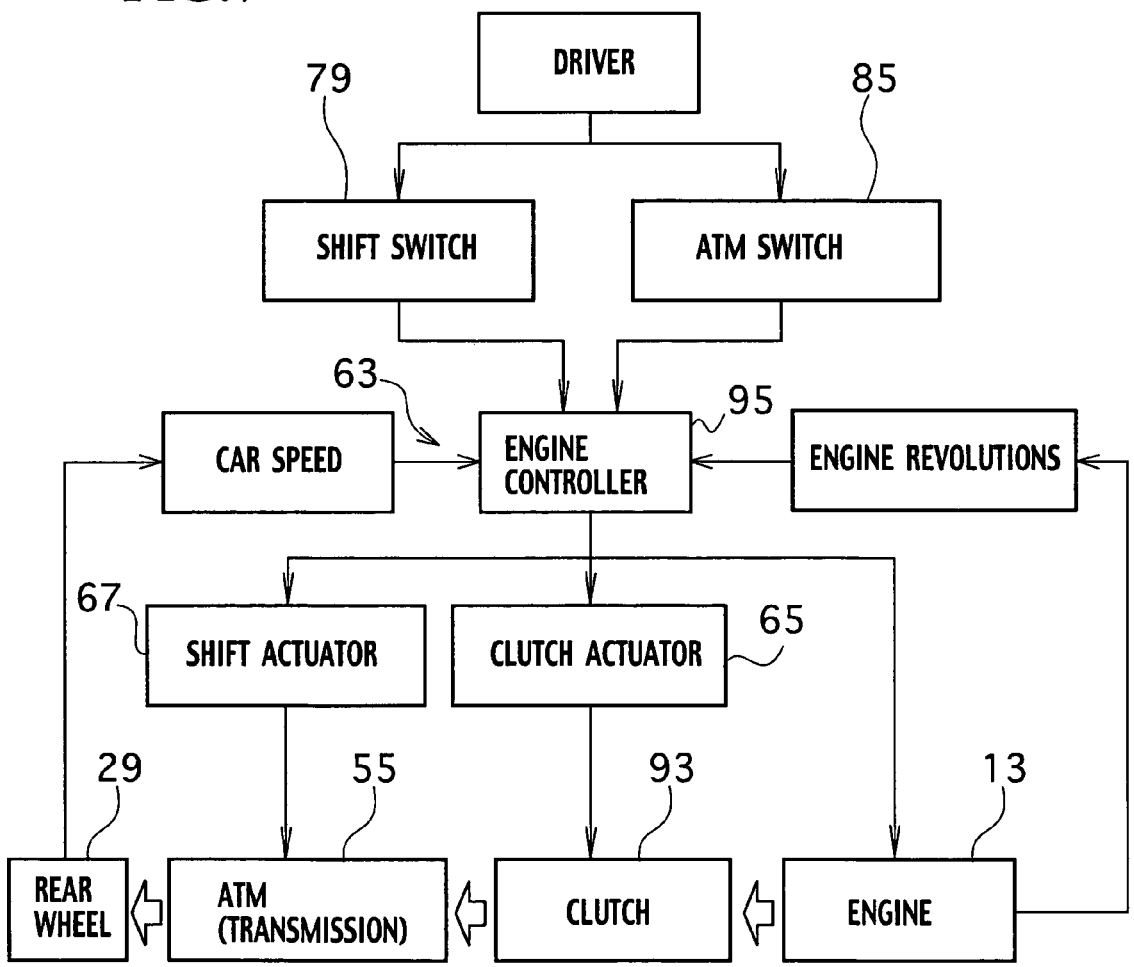
FIG. 7 is a system diagram of an AMT mechanism showing the embodiment of the present invention.

Referring to FIG. 7, switching of the multistage shifting mechanism as well as of a clutch 93 is driven by unillustrated hydraulic mechanisms including motors, pumps, oil tanks, accumulators, and the like by use of the AMT mechanism 63. The clutch actuator 65 is provided with a stroke sensor (not shown) for detecting a stroke of the clutch 93 by detecting a position of the rod 73, for example, and the transmission 55 is provided with various sensors such as a car speed sensor or a shift position sensor.

Based on detection data of the various sensors and instructions from the shift switch 79, the clutch actuator 65 and the shift actuator 67 are driven by an engine controller 95. That is to say, a series of shifting operations including disconnection of the clutch 93, shifting of the change gears, and connection of the clutch 93 are operated automatically by given programs and other operation circuits stored in advance in the engine controller 95.

As described above, as a placement structure of the AMT mechanism of the motorcycle as the embodiment of the present invention, the AMT mechanism 63 including the clutch actuator 65, the shift actuator 67, other components necessary for the AMT, and the like is located behind the cylinder block 47 of the engine unit 13 and above the transmission 55.

For this reason, when the motorcycle 1 gets a flat tire upon cornering, since the AMT mechanism 63 is located behind the cylinder block 47 and above the transmission 55, it is possible to avoid a possibility that the AMT mechanism 63 hits the ground even when the motorcycle 1 is tilted to the left side or the right side, for example.

As a result, it is possible to prevent a decrease in a bank angle of the motorcycle 1 while cornering.

Moreover, even if the motorcycle 1 tumbles over, since the AMT mechanism 63 is located behind the cylinder block 47 and above the transmission 55, it is possible to reduce a possibility that the AMT mechanism 63 hits the ground in the first place, and damage incurred to the AMT mechanism 63 can be reduced.

Figure 5:
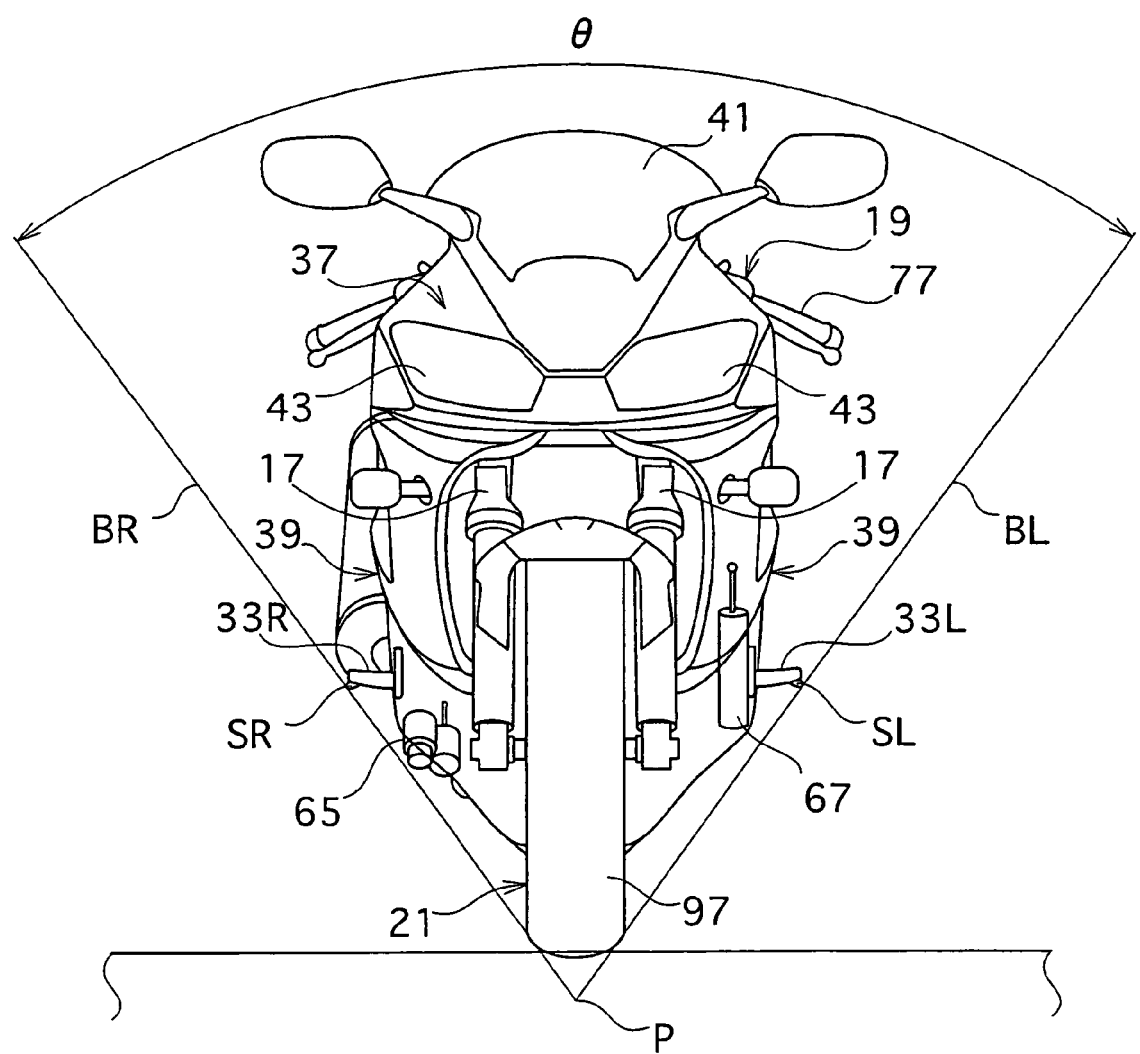
FIG. 5 is a front view of a motorcycle of an embodiment of the present invention.

Moreover, when description is made on a placement structure of the AMT mechanism of the motorcycle as another embodiment of the present invention, the AMT mechanism 63 is located inside a bank angle θ of the motorcycle 1 as shown in FIG. 5. The bank angle indicates an angle θ formed between straight lines BL and BR, which are defined by connecting left and right parts of tread surfaces of tires 97 on the front wheel 21 and the rear wheel 29 to a point SL and a point SR representing tips of left and right steps 33L and 33R (a point P represents a intersection point of the straight lines BL and BR).

In FIG. 5, unlike the placement structure of the AMT mechanism of the above-described embodiment, the shift actuator 67 is located relatively below the motorcycle 1 on the left side in the traveling direction (on the right side in FIG. 5), however is located inside the bank angle θ. Meanwhile, the clutch actuator 65 is also located relatively below the motorcycle 1 on the right side in the traveling direction (on the left side in FIG. 5), however is located inside the bank angle θ.

Therefore, as similar to the above-described embodiment, an effect of preventing the decrease in the bank angle of the motorcycle 1 while cornering is obtained, and a possibility of fatal damage incurred to the AMT mechanism 63 is reduced even when the motorcycle 1 tumbles over.

It is to be noted that the invention is not limited to the embodiments described above and can be embodied in other aspects by carrying out appropriate modifications.

The invention claimed is:

1. A motorcycle comprising:
   an engine supported by a car body frame and having a crankshaft;
   a cylinder block constituting a part of this engine;
   a crankcase located below this cylinder block;
   a transmission being located behind this crankcase and including a multistage shifting mechanism having multistage change gears; and
   a shift actuator having an axis and configured to shift the change gears of this transmission through a link mechanism,
   wherein the shift actuator is formed into a tubular shape and is located behind the cylinder block, above the transmission and in front of a rear end of the transmission so as to allow the axis to be oriented in a car width direction, and
   the crankshaft is oriented in the car width direction.

2. A motorcycle comprising:
   an engine supported by a car body frame and having a crankshaft;
   a cylinder block constituting a part of this engine;
   a crankcase located below this cylinder block;
   a transmission being located behind this crankcase and including a multistage shifting mechanism having multistage change gears;
   a clutch configured to connect/disconnect transmission of rotation when shifting the change gears of this transmission; and
   a clutch actuator having an axis and configured to actuate this clutch through a link mechanism,
   wherein the clutch actuator is formed into a tubular shape and is located behind the cylinder block, above the transmission and in front of a rear end of the transmission so as to allow the axis to be is oriented in a car width direction; and
   the crankshaft is oriented in the car width direction.

3. A motorcycle comprising:
   an engine supported by a car body frame and having a crankshaft;
   a cylinder block constituting a part of this engine;
   a crankcase located below this cylinder block;
   a transmission being located behind this crankcase and including a multistage shifting mechanism having multistage change gears;
   a shift actuator configured to shift the change of gears of this transmission through a link mechanism;
   a clutch configured to connect/disconnect transmission of rotation when shifting the change gears of this transmission; and
   a clutch actuator configured to actuate this clutch through a link mechanism,
   wherein the shift actuator and the clutch actuator are located above the transmission and in front of a rear end of the transmission; and
   the crankshaft is oriented in the car width direction.

4. A motorcycle comprising:
   a car body frame including a left and right pair of steps for placing feet of a driver;
   an engine supported by this car body frame;
   a cylinder block constituting a part of this engine;
   a crankcase located below this cylinder block;
   a transmission being located behind this crankcase and including a multistage shifting mechanism having multistage change gears;
   a shift actuator configured to shift the change gears of this transmission;
   a clutch configured to connect/disconnect transmission of rotation when shifting the change gears of this transmission;
   a clutch actuator configured to actuate this clutch; and
   a tire supported by the car body frame,
   wherein the clutch actuator and the shift actuator are located separately on left and right sides so as to sandwich a center of the tire in a space between straight lines respectively connecting a tread surface of the tire and tips of the left and right pair of steps from a frontal viewpoint.

5. The motorcycle according to claim 4,
   wherein the shift actuator has an axis and is formed into a tubular shape; and
   the shift actuator is located so as to render the axis inclined relative to a vertical direction.

6. The motorcycle according to claim 4,
   wherein the clutch actuator has an axis and is formed into a tubular shape; and
   the clutch actuator is located so as to render the axis inclined relative to a vertical direction.

7. The motorcycle according to claim 5,
   wherein the clutch actuator has an axis and is formed into a tubular shape; and
   the clutch actuator is located so as to render the clutch actuator axis inclined relative to the vertical direction.

* * * * *